S. W. APPLEGATE.
AEROPLANE.
APPLICATION FILED APR. 20, 1909.

939,651.

Patented Nov. 9, 1909.
3 SHEETS—SHEET 1.

Inventor
Samuel W. Applegate.

Witnesses

S. W. APPLEGATE.
AEROPLANE.
APPLICATION FILED APR. 20, 1909.

939,651.

Patented Nov. 9, 1909.
3 SHEETS—SHEET 2.

Witnesses

Inventor
Samuel W. Applegate.
By Chandler Chandler
Attorney

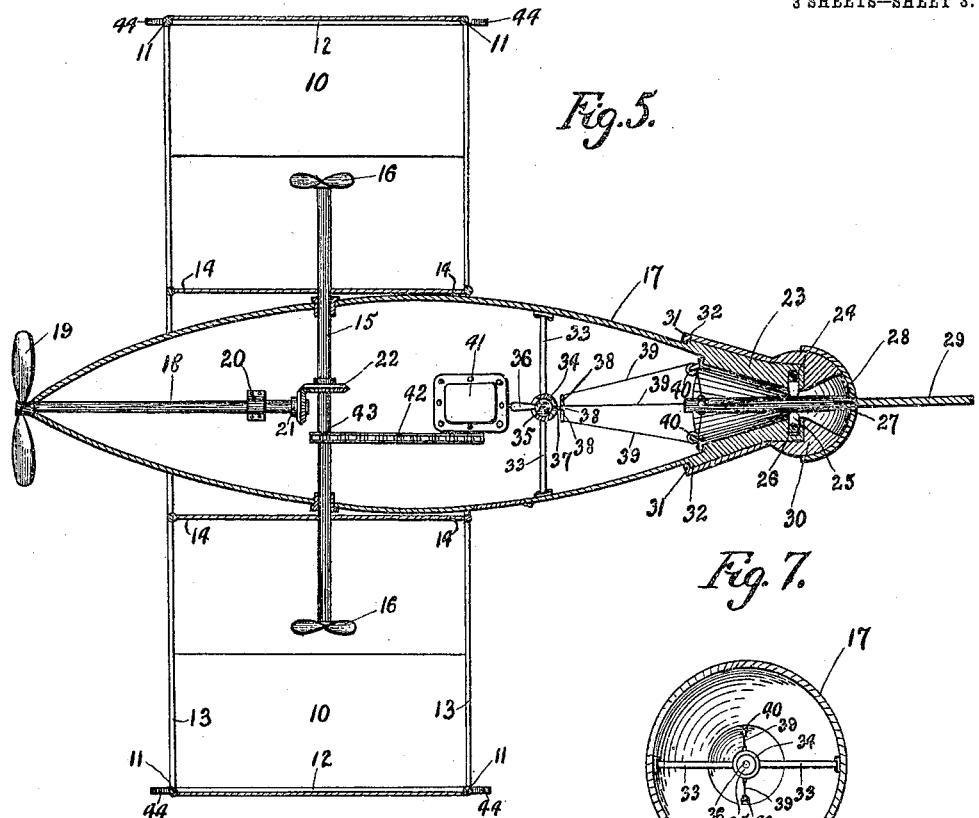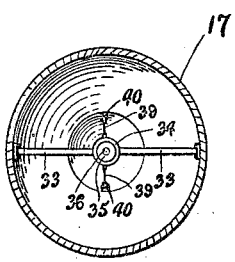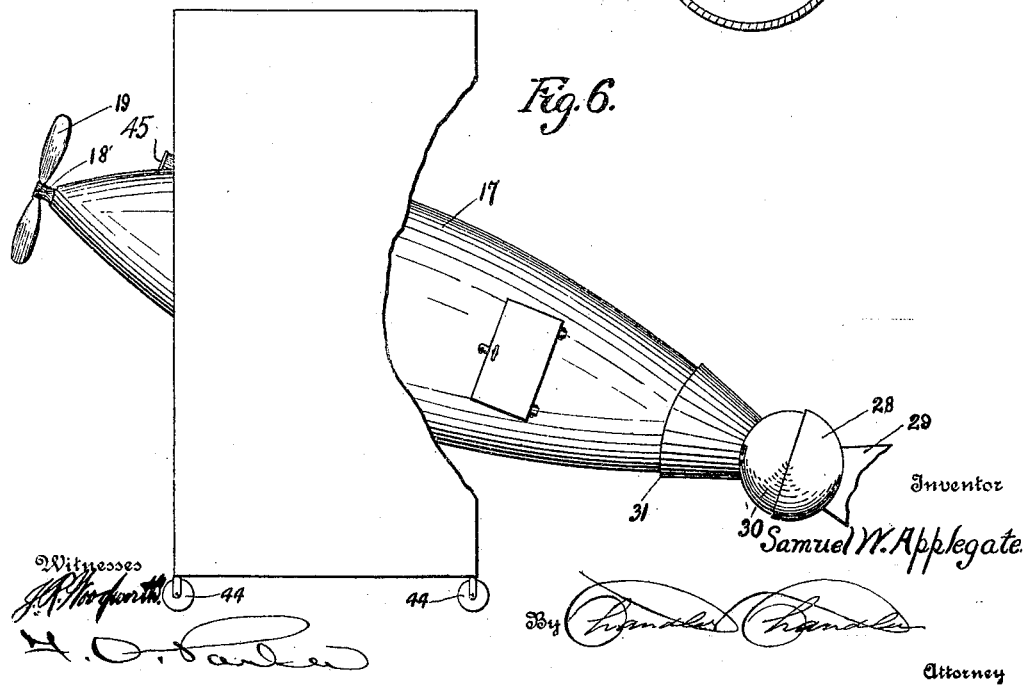

UNITED STATES PATENT OFFICE.

SAMUEL W. APPLEGATE, OF SOUTH BEND, INDIANA.

AEROPLANE.

939,651.  Specification of Letters Patent.  Patented Nov. 9, 1909.

Application filed April 20, 1909. Serial No. 490,998.

*To all whom it may concern:*

Be it known that I, SAMUEL W. APPLEGATE, a citizen of the United States, residing at South Bend, in the county of St. Joseph, State of Indiana, have invented certain new and useful Improvements in Aeroplanes; and I do hereby declare the following to be a full, clear, and exact description of the invention, such as will enable others skilled in the art to which it appertains to make and use the same.

The invention relates to aerial navigating machines and more particularly to the class of aeroplanes.

The primary object of the invention is the provision of an aerial navigating machine in which there are arranged directly opposed aeroplanes united together and having pivotally disposed between the same a substantially cigar-shaped shell, the said planes being adapted to assist in the suspension of the shell so that the same will be caused to travel through the air without recourse to gas fields or the like, and the said shell being adapted to effect the proper ascension and descension of the planes.

Another object of the invention is the provision of a device of this character which may travel along the ground until sufficient speed is acquired to insure the rising of the said device and means to enable the proper steering or guiding of the latter.

A still further object of the invention is the provision of a device of this character in which a slow and gradual descent of the body is assured should the motor medium become ineffective while the device is elevated in the air.

With these and other objects in view, as will clearly hereinafter appear, the invention consists in certain novel features of construction, combination and arrangement of elements or parts, hereinafter fully described, illustrated in the accompanying drawings which disclose the preferred form of embodiment of the invention, and particularly brought out in the appended claims, it being understood that various changes in the form, proportions, size and minor details of the structure may be made without departing from the spirit or sacrificing any of the advantages of the invention.

Figure 1:
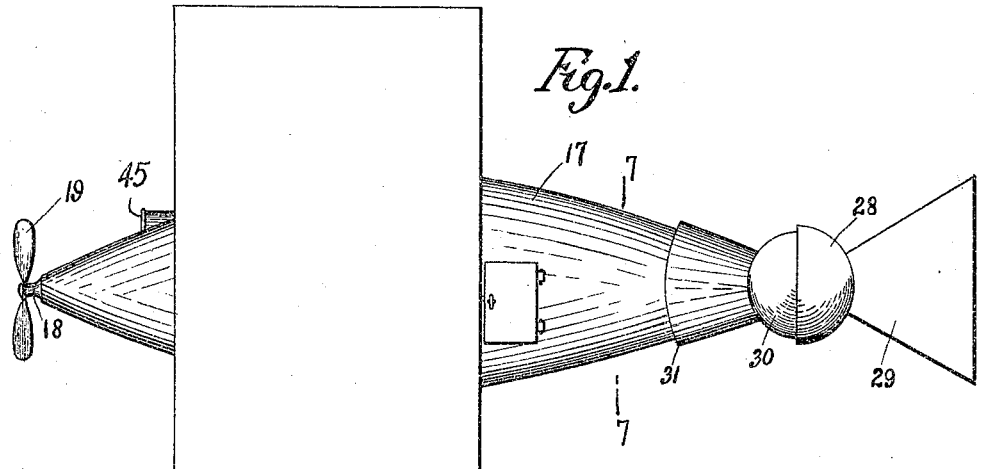
Figure 2:
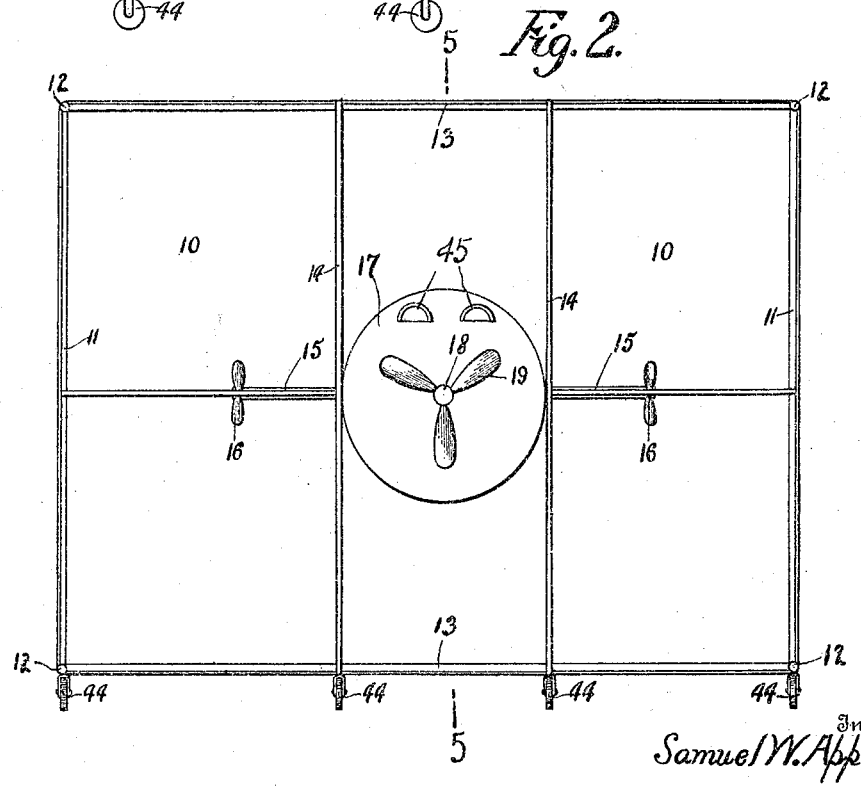
Figure 3:
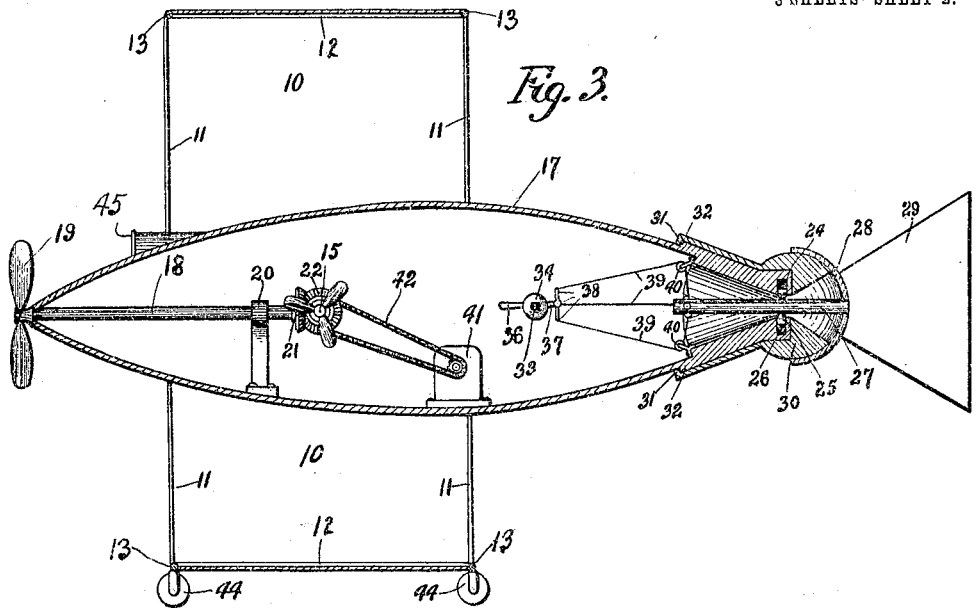
Figure 4:
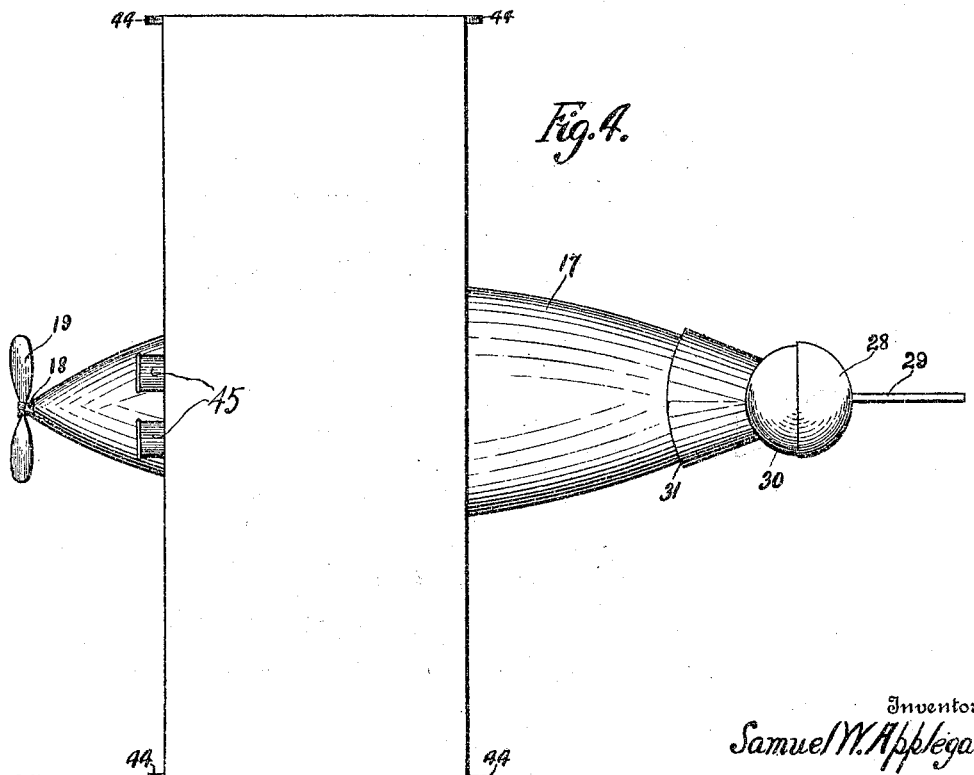

In the drawings:—Figure 1 is a side elevation of the invention. Fig. 2 is a front elevation. Fig. 3 is a longitudinal sectional view. Fig. 4 is a top plan view. Fig. 5 is a sectional view on the line 5—5 of Fig. 2. Fig. 6 is a side elevation with the device in position for ascension. Fig. 7 is a sectional view on the line 7—7 of Fig. 1.

Similar reference characters indicate corresponding parts throughout the several views in the drawings.

In the drawings, the numeral 10 designates generally spaced oppositely arranged skeleton frames each of which includes spaced vertical bars 11, united to upper and lower cross bars 12, to form the open frames, which latter are held in their spaced relation to each other by cross uniting bars 13, which rigidly unite the frames together. Covering the sides, tops and bottoms of the frames is oiled silk or other light sheet material to form aeroplanes.

Located centrally of the frames 10, are horizontal reinforcing or brace bars 14, the same having suitable bearings in which is journaled a rotatable shaft 15, the opposite ends of which project to a point centrally of the frames forming the aeroplanes, and to which ends are fixed paddle wheels or bladed propellers 16. These propellers 16 are adapted to act upon the air for advancing the machine while suspended in the air and also to assist in lifting it after the same has been started. These propellers are illustrated in a conventional manner only, as any suitable form of propellers may be used. Pivotally mounted upon the said shaft 15, for rocking movement between the aeroplanes is a cigar-shaped shell or body 17, in the forward or front tapering end of which is journaled one end of a rotatable shaft 18, which latter has fixed thereto a curved bladed propeller 19, and which shaft 18 is also journaled in a bearing bracket 20, rising vertically within the body, and to the inner end of the shaft is fixed a pinion 21, enmeshing with a gear 22, fixed to the shaft 15, so that when the same is rotated it will impart similar movement to the shaft 18, for the purpose as will be hereinafter described.

The rear extremity of the shell or body 17, is formed with a thickened frusto-conical-shaped open end 23, which latter has at its inner face an annular groove 24, in which is loosely mounted a split bearing ring 25, the same being held yieldably by rings 26, and through which ring passes a steering arm 27, the same projecting inwardly from a semi-spherical-shaped socket piece 28, from which projects a tail piece or wing 29. The semispherical socket piece 28, receives a ball casting 30, to form a knuckle joint between the tail wing and the rear end of the shell or body. This ball casting 30, is fixedly mounted at the rear end of the shell or body by an inwardly directed securing flange 31, engaging a shoulder 32, exteriorly of the shell or body.

Secured within the shell or body 17, is a bracket 33, having formed centrally thereof a ball socket or housing 34, receiving the ball 35, of a manually operable guide handle 36, the latter adapted for use in controlling the guide wing 29, of the device.

Projecting rearwardly from the ball 35, of the manually operable handle is an extension 37, having formed at its free end radially disposed arms 38, to which are connected guide ropes or cables 39, the latter trained over pulleys 40, and having their opposite ends fixed to the steering arm of the tail piece or wing, so that upon rocking the handle 36, the tail wing will be shifted from right to left or vertically at right angles thereto, for the guidance of the device and to enable the navigator to travel at any desired height in the air.

It is obvious that normally the tail wing 29 is disposed in a vertical plane so that the bladed ends thereof may be swung in a horizontal plane. Should it be desired to have the blade of the tail piece 29 lie in a horizontal plane so that it may swing vertically to guide the machine to cause the ascending or descending thereof it is necessary to detach the ends of the ropes or cables 39 from the steering arm 27 which will permit the turning of the tail piece 29 so that it may assume a horizontal plane whereupon the cables or ropes 39 are properly attached to the steering arm 27 to permit the proper manipulation of the tail wing by an operator.

Mounted within the shell or body 17 is a suitable motor 41, driving a sprocket chain 42, which latter is trained over a sprocket wheel 43, fixed to the shaft 15, for rotating the latter.

At the bottom of each plane are arranged ground wheels 44, which come into play when the machine touches the ground and these wheels are mounted in pivotal supports so that they may be at an angle of 90 degrees to permit the device to be adjusted in a position for the desired direction of flight.

In operation the machine is placed on the ground resting on the wheels and after the machine is started it will travel along the ground until sufficient momentum is acquired to lift the aeroplane, it being understood of course that the shell or body 17, is moved on its axis so as to have the front end raised or elevated with respect to its rear end, this being accomplished by an operator moving rearward within the body or shell 17 and as the aeroplane rises the shell or body will gradually assume a horizontal position for the forward travel or navigation of the device by the operator changing his position to the forward end of the shell or body.

The shell or body 17, is provided at its forward end with glass paneled sight openings 45 so that the operator can determine the desired direction of navigation by the device.

What is claimed is:—

1. In an aerial navigator, oppositely disposed aeroplanes united in spaced relation to each other, a body mounted for tilting movement between said planes, a propeller at the forward end of the body, propellers arranged centrally within the planes, means operating the said propellers in unison, a tail piece, means forming a ball and socket connection between the tail piece and the rear end of the body, and manually operable means for adjusting the tail piece.

2. In an aerial navigator, spaced oppositely disposed open frame structures united together and having a covering to provide aeroplanes, a substantially cigar-shaped shell pivotally mounted centrally between the said planes, and propeller means for effecting the forward travel of the navigator.

3. In an aerial navigator, spaced oppositely disposed open frame structures united together and having a covering to provide aeroplanes, a substantially cigar-shaped shell pivotally mounted centrally between the said planes, propeller means for effecting the travel of the navigator, and adjustable guide means at the rear end of the shell.

In testimony whereof, I affix my signature, in presence of two witnesses.

SAMUEL W. APPLEGATE.

Witnesses:
FRED W. KELLER,
CLAUDINE BRICKELL.